United States Patent

Succi et al.

[11] Patent Number: 5,150,604
[45] Date of Patent: Sep. 29, 1992

[54] METHOD FOR DETERMINING THE END OF USEFUL LIFE OF AN INERT GAS PURIFIER AND APPARATUS THEREFORE

[75] Inventors: Marco Succi; Fabrizio Doni, both of Milan, Italy

[73] Assignee: Saes Getters SpA, Milan, Italy

[21] Appl. No.: 611,652

[22] Filed: Nov. 13, 1990

[30] Foreign Application Priority Data

Jan. 5, 1990 [IT] Italy .................. 19012 A/90

[51] Int. Cl.⁵ .................................... G01N 15/00
[52] U.S. Cl. ........................... 73/38; 73/31.04; 116/DIG. 25
[58] Field of Search ........... 73/19.05, 38, 31.04, 73/861.63; 116/268, DIG. 25; 340/611

[56] References Cited

U.S. PATENT DOCUMENTS

| 3,135,108 | 6/1964 | Santeler | 73/31.04 X |
| 3,413,855 | 12/1968 | Bloom | 73/38 X |
| 4,751,501 | 6/1988 | Gut | 73/38 X |
| 4,912,963 | 4/1990 | Mori et al. | 73/38 |

FOREIGN PATENT DOCUMENTS 83134  3/1989  Japan ........................ 73/38

Primary Examiner—Hezron E. Williams
Assistant Examiner—Joseph W. Roskos
Attorney, Agent, or Firm—David R. Murphy

[57] ABSTRACT

The present invention provides a process, and an apparatus for accomplishing that process, for indicating when an inert gas purifier is about to loose its required level of purification efficiency. The inert gas purifier can therefore be replaced before the impurity levels of its purified output gas reach undesirably high values.

21 Claims, 3 Drawing Sheets

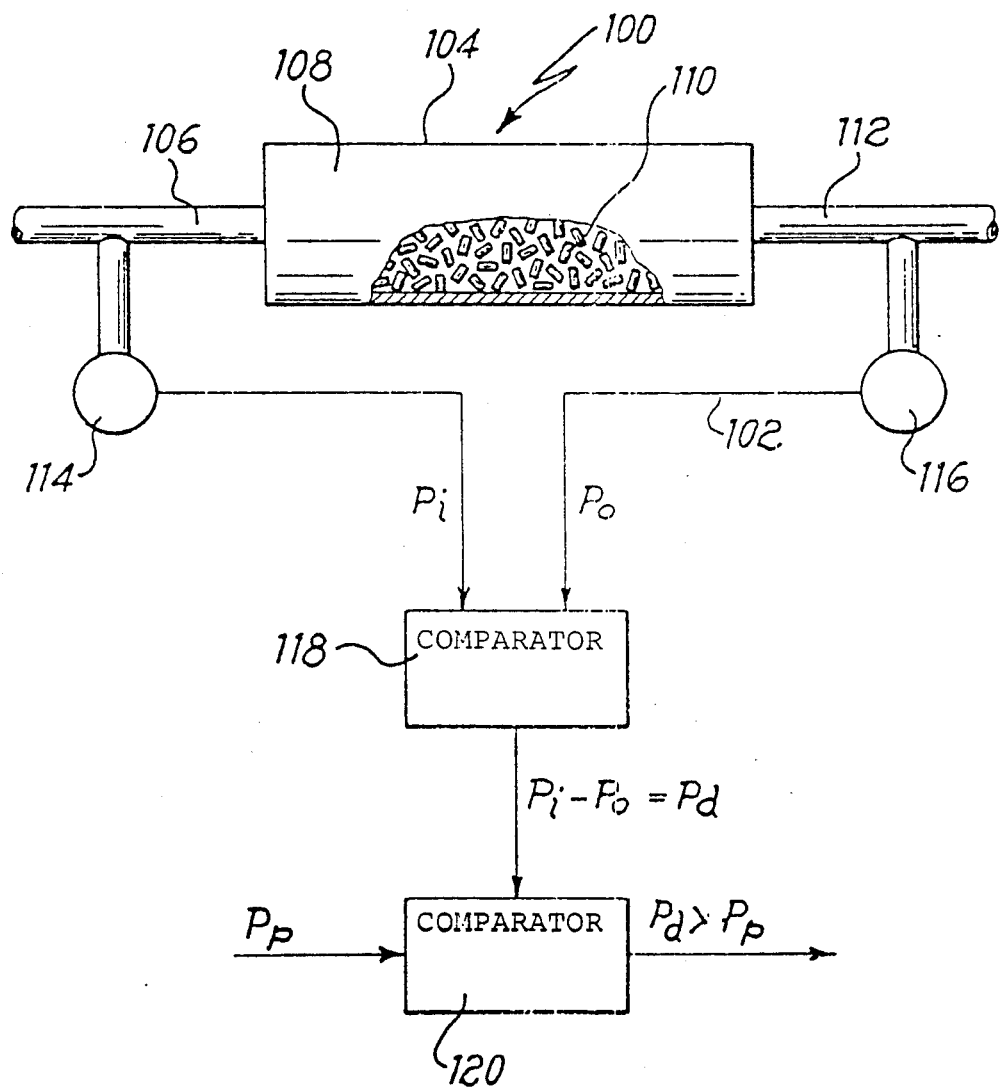

METHOD FOR DETERMINING THE END OF USEFUL LIFE OF AN INERT GAS PURIFIER AND APPARATUS THEREFORE

BACKGROUND TO THE INVENTION

Gases are used in many industrial processes. Certain of these processes, such as the manufacture of semi-conductor devices, require that these gases be of extremely high purity. Any impurity gases present must presently be held in the range of several parts per billion relative to the process gas (i.e. several parts of impurity to $10^9$ parts of process gas).

To reach this low impurity level there are employed "gas purifiers". In the semiconductor industry there are widely employed "inert gas purifiers". By this term is meant a purifier of the rare gases He, Ne, Ar, Kr, Xe and $N_2$. Such inert gas purifiers have been described, for example, in British patents Nos. 2,127,079 and 2,127,080. See also EP patent application No. 0,365,490.

While such inert gas purifiers are very efficient in maintaining the impurity levels of their output gas at the very low values required, they eventually start to loose their ability to remove the impurity gases. Thus the process gases become less pure and the semiconductor devices produced commence to exhibit an excessive number of defects and must therefore be rejected. Such rejects can be extremely costly especially when one considers the manufacture of semiconductor devices which require the use of micron (micro-meter) or sub-micron technologies.

It is therefore essential to ensure that the impurity level of the process gas is below the required limits.

Several methods are presently known for monitoring the impurity level of these inert process gases. One method is to constantly monitor the impurity level of each impurity gas. This, however, requires extremely specialized equipment and highly trained personnel. Another method is to measure the quantity of gas which has passed through the gas purifier and, assuming a known impurity content, calculate when the gas purifier should begin to loose its purification efficiency. Unfortunately the impurity level of the gas to be purified, may vary in an unknown manner generating errors in the calculation resulting in the continued use of the purifier even though it has reached the end of its useful life. Other methods have been proposed using physical changes in the properties of the impurity gas sorbing material such as, for instance, a change of colour.

Furthermore, when for instance the gas purification takes place, by means of metallic gettering materials there may be no indication of any colour change.

OBJECTS OF THE PRESENT INVENTION

It is therefore an object of the present invention to provide an improved method and apparatus for indicating when an inert gas purifier is no longer able to provide its required level of purification efficiency which is free from one or more of the disadvantages of prior inert gas purifiers.

It is yet another object of the present invention to provide an improved method and apparatus for indicating when an inert gas purifier is no longer able to provide its required level of purification efficiency which does not require the use of extremely specialized equipment.

It is a further object of the present invention to provide an improved method and apparatus for indicating when an inert gas purifier is no longer able to provide its required level of purification efficiency which does not require the use of highly trained personnel.

It is another object of the present invention to provide an improved method and apparatus for indicating when an inert gas purifier is no longer able to provide its required level of purification efficiency which is not influenced by unknown variations of the impurity level of the gas to be purified.

It is yet a further object of the present invention to provide an improved method and apparatus for indicating when an inert gas purifier is no longer able to provide its required level of purification efficiency which is based on a physical change in the properties of the impurity gas sorbing material which can be measured in a non-subjective manner.

Further objects and advantages of the present invention will become clear to those skilled in the art by reference to the following description herewith and drawings wherein:

BRIEF DESCRIPTION OF THE DRAWINGS

FIG. 1 is a diagrammatic representation useful in describing the present invention.

BRIEF DESCRIPTION OF THE INVENTION

Figure 2A:
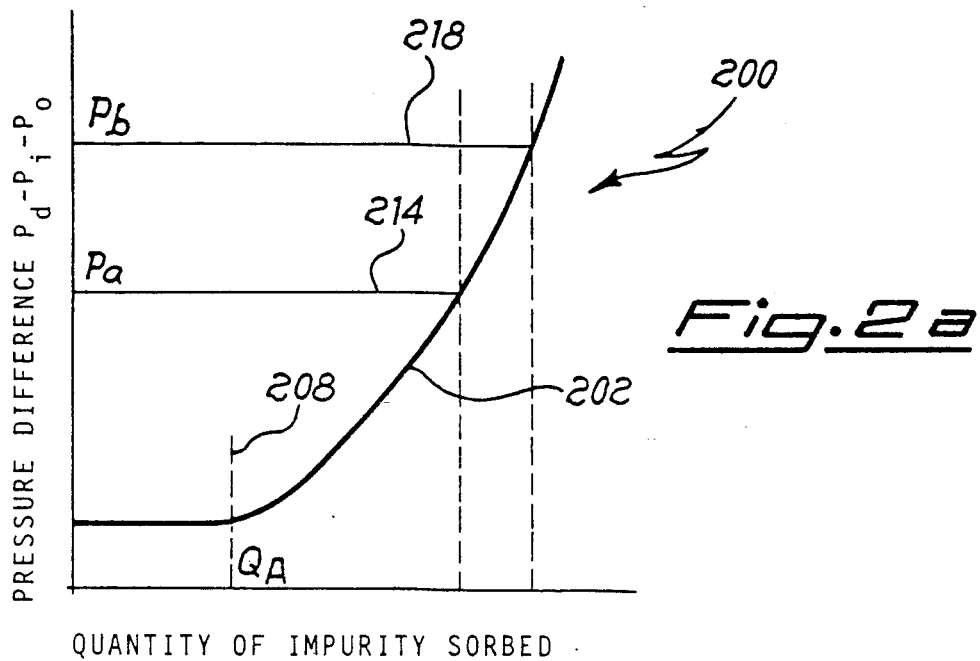
FIGS. 2a and b are generic representations of the results obtained by the use of the representation shown in FIG. 1.

When materials such as metals or metallic alloys sorb gases, very often their volume increases. This is especially the case in the field of $H_2$ storage alloys where this volume increase is regarded as a problem and attempts are made to avoid any effects produced by such a volume increase. See U.S. Pat. No. 4,133,426. However the present inventors have found that in the field of inert gas purification such volume increases, whether caused by $H_2$ or other gases, can be usefully applied to indicate when the inert gas purifier is about to reach the end of its useful life.

DETAILED DESCRIPTION OF THE INVENTION AND DRAWINGS

The present invention proceeds along the lines of providing an apparatus for determining the end of useful life of an inlet gas purifier which has an impure inert gas inlet in fluid communication with a housing containing a gas sorbing material, said housing being in fluid communication with a purified gas outlet. The apparatus comprises a means for measuring the gas pressure ($P_i$) at the inlet and a means for measuring the gas pressure ($P_o$) at the outlet. There is also a means for calculating the gas pressure difference ($P_d = P_i - P_o$) between the inlet and the outlet and a means for comparing $P_d$ with a predetermined pressure value $P_p$. There is also a means for indicating when $P_d$ is equal to or greater than $P_p$ and thus indicating that the inert gas purifier has reached the end of its useful life.

Referring now to the drawings and in particular to FIG. 1 there is shown a diagrammatic representation 100 useful in describing the present invention. An apparatus 102 for determining the end of useful life of an inert gas purifier is shown attached to a partially cutaway view of an inert gas purifier 104. Purifier 104 has an impure inert gas inlet 106 in fluid communication with a housing 108 which contains a gas sorbing material (110). Housing 108 is also in fluid communication with a purified gas outlet 112. Apparatus 102 has a means 114 for a measuring the gas pressure ($P_i$) of the impure inert gas at inlet 106. A further means 116 is provided for measuring the purified gas pressure ($P_o$) at outlet 112. In addition a means 118 is provided for determining the gas pressure difference ($P_d = P_i - P_o$) between inlet 106 and outlet 112. A further means 120 compares the pressure difference, $P_d$, and indicates when $P_d$ is equal to or greater than $P_p$ thus indicating that the inert gas purifier has reached the end of useful life.

It will be realized that means 114, 116 and 118 can be combined into a single pressure difference measuring gauge directly giving the value of $P_d$.

Figure 2B:
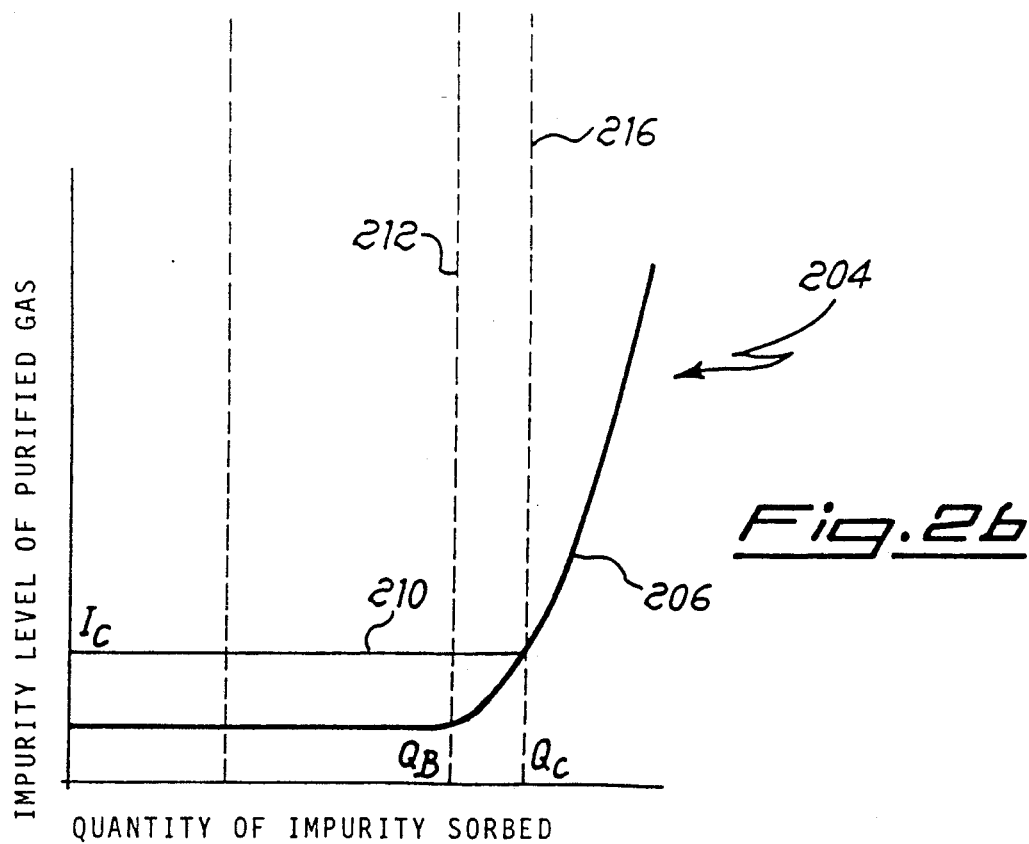

Referring now to FIGS. 2a and 2b there are shown two graphs in which graph 200 plots a curve 202 which shows the relationship between the pressure difference between the inlet and outlet of an inert gas purifier during gas purification as a function of the quantity of impurities sorbed by the purifier. Graph 204 plots a curve 206 which shows the relationship of the impurity level of the purified gas at the outlet of the purifier as a function of the quantity of impurities sorbed by the purifier.

It is seen from curve 202 that during purification the initial pressure difference remains constant until a certain quantity of impurities, $Q_A$, indicated by line 208 have been sorbed. Above this quantity the pressure difference continuously increased. Surprisingly the impurity level of the purified gas remains substantially constant and at a level below a critical impurity level $I_c$, indicated by line 210, above which the purified gas is considered insufficiently pure for the process in which it is being used. However, after a certain quantity of impurities, $Q_B$, as indicated by line 212, have been sorbed the impurity level of the purified gas starts to increase. This corresponds to a pressure difference $P_a$ as indicated by line 214. As even more gas is purified the impurity level of the purified gas continues to increase until it reaches the critical value $I_c$ which corresponds to the quantity of impurities sorbed, $Q_c$, as indicated by line 216, this in turn corresponds to pressure difference, $P_b$, as shown by line 218.

Thus when the pressure difference between the purifier inlet 106 and outlet 112 has reached the value $P_b$ the purifier has reached the end of its useful life.

In practice the means 114, 116 for measuring the gas pressures are any means capable of giving an indication of the pressures but are preferably measuring devices which indicate the pressure in terms of an electric signal. Means 118 for determining the gas pressure difference is any means which is able to give an indication of the difference in pressure between the pressures indicated by means 114 and 116.

It is preferably an electric or electronic device which indicates when the difference in terms of an electrical signal. This latter electric signal can then be used to provide an audible or visual indication that the purifier has reached the end of its useful life. The signal could also be used to operate one or more valves to cut off the flow of gas being purified or to perform any other operation desirable or necessary when the purifier has reached the end of its useful life.

It will be realized that the predetermined pressure value $P_p$ used for the comparison by means 120 is the same as the value $P_b$ determined from FIGS. 2a and b. However, a value of $P_p$ less than $P_b$ could be used in order to provide a margin of safety to ensure that the impurity level of the purified gas stays well below the critical impurity level $I_c$. For instance a value of $P_p$ could be chosen having a value $$P_a < P_p < P_b$$

The value of $P_p$ depends upon the geometry of the gas purifier housing, the physical form of the gas sorbing material and other factors and is therefore best determined experimentally is described in the example below.

The method of the present invention for determining the end of useful life of an inert gas purifier having an impure inert gas inlet in fluid communication with a housing containing a gas sorbing material, said housing being in fluid communication with a purified gas outlet said method comprises the steps of measuring the gas pressure ($P_i$) at the inlet by means 114 and measuring the gas pressure ($P_o$) at the outlet by means 116 and determining the gas pressure difference ($P_d$) = ($P_i - P_o$) between the inlet and the outlet by means 118 and comparing $P_d$ with a predetermined pressure value $P_p$ by means 120 and indicating when $P_d > P_p$ to indicate that the inert gas purifier has reached the end of useful life.

EXAMPLE

An inert gas purifier in the form of a stainless steel cylinder having an outside diameter of 2.5 cm and a length of 7 cm was filled with 50 g of pills each of 6 mm diameter and 4 mm in thickness. The composition of the pills was an alloy of nominal composition 70% zirconium—24.6% vanadium—5.4% iron (by weight). The gas purifier was provided with an impure inlet gas inlet tube having attached an MKS pressure measuring instrument and a purified gas outlet tube provided with a Galileo pressure measuring instrument. A resistance heater wound round the gas purifier maintained its temperature at any desired value.

A cylinder of He having an impurity content, even better than that of normal semiconductor process gases, as listed under "cylinder I" in Table I was attached to the purifier inlet. He gas from the cylinder was allowed to flow through the purifier which was kept at 400° C. After sufficient gas had flown through the purifier to purge it the impurity levels of the output gases were measured and are reported in column A of Table II.

In order to perform an accelerated life test of the purifier Cylinder I was replaced by an Ar gas cylinder having an artificially high impurity gas content which is given in Table I under column "Cylinder II". The highly impure Ar gas was caused to flow through the purifier with an inlet pressure constantly controlled such that the outlet pressure was maintained constant at 1.31 bar and the gas flow rate was 250 cm³/min.

Figure 3A:
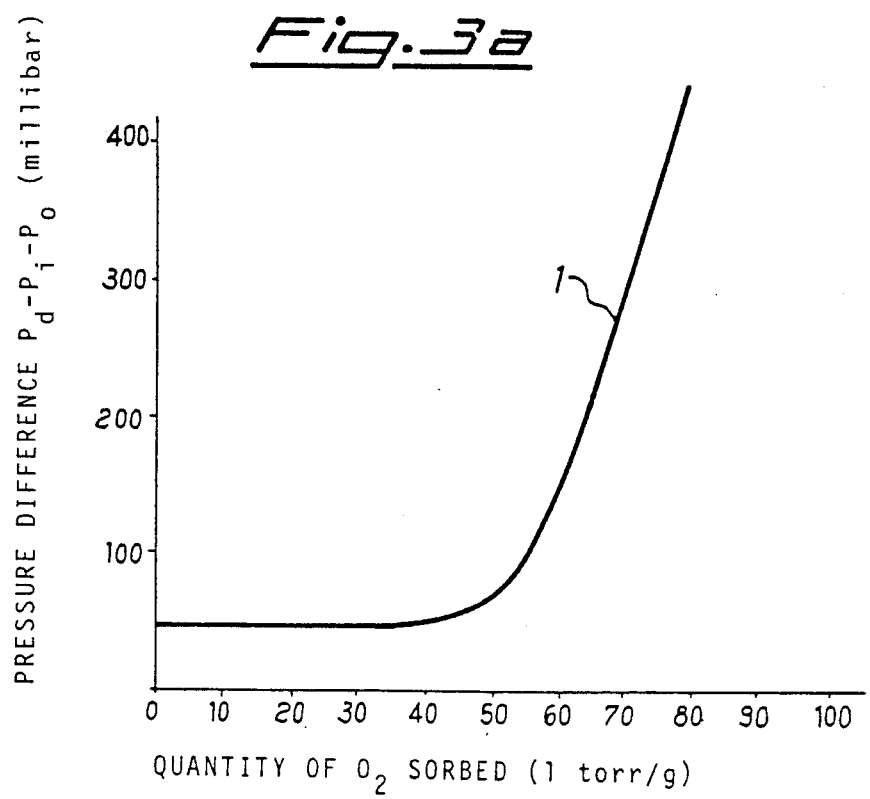
FIGS. 3a and b are graphs showing the practical results obtained with the use of an apparatus according to FIG. 1.

FIG. 3a shows the pressure difference across the purifier ($P_i - P_o$) as curve 1 plotted as a function of the amount of oxygen sorbed as calculated from the Ar flow rate and $O_2$ impurity content. As can be seen after the sorption of a certain quantity of $O_2$ (and other impurities) there is a continuous increase in pressure difference as more oxygen is sorbed.

At intervals the flow of highly impure gas was interrupted to measure the purification efficiency of the purifier. Gas from cylinder 1 was allowed to flow through the purifier and the impurity levels of the output gas were measured the output impurity levels are plotted on FIG. 3b as a function of the quantity of $O_2$ sorbed. The values are also reported in Table 2 column B for the impurity levels measured after sorption of 77.5 l torr/g of $O_2$. The measurements after the sorption of 55 l torr/g of $O_2$ were made using helium gas having the impurity content reported in Table I under the heading Cylinder III. The measurement of purification efficiency measured when the $O_2$ sorbed quantity had reached 90 l torr/g were made using helium gas having the impurity content reported in Table I under the heading Cylinder IV and are reported in Table II, column C.

Figure 3B:
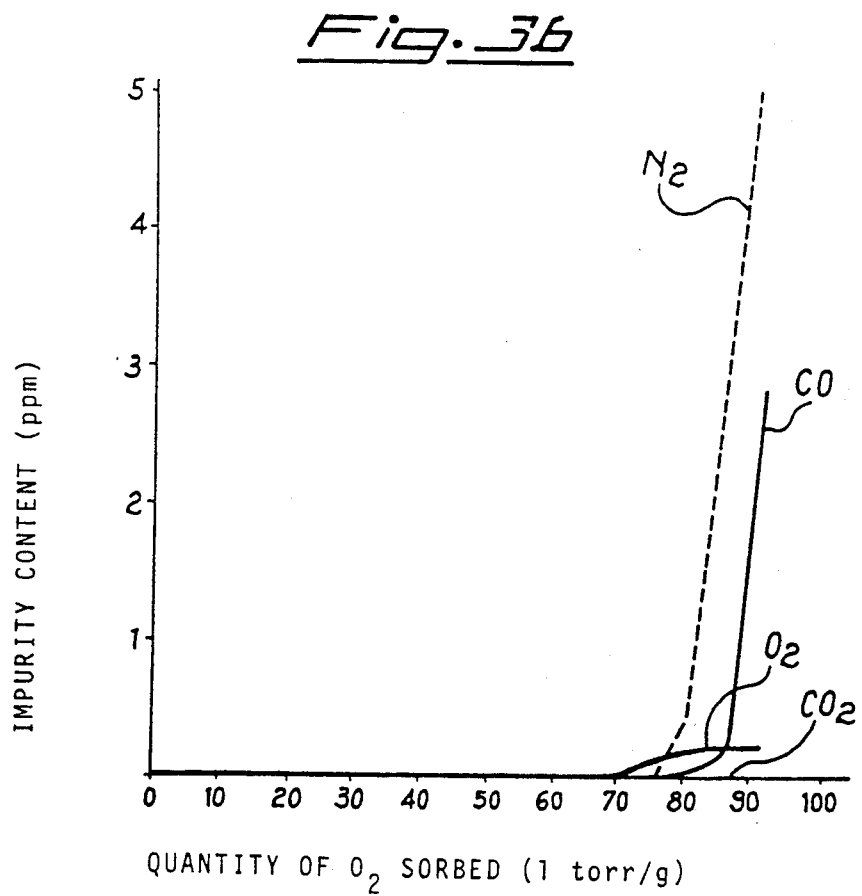

As can be seen from the graphs of FIGS. 3a and 3b the pressure drop across the purifier increases considerably before the impurity of the outlet gas reached unacceptably high levels. A value of pressure drop is chosen to indicate end of useful life of the purifier.

TABLE I

| Impurity gas | Cylinder I | Cylinder II | Cylinder III | Cylinder IV |
|---|---|---|---|---|
| CO | 8.7 ppm | 207 ppm | 25 ppb | 35 ppb |
| $N_2$ | 8 ppm | 860 ppm | 53 ppm | 5.9 ppm |
| $CH_4$ | 9 ppm | 200 ppm | <10 ppb | <10 ppb |
| $CO_2$ | 8.1 ppm | 211 ppm | 250 ppb | 210 ppb |
| $O_2$ | 10 ppm | 850 ppm | 6.6 ppm | 4.3 ppm |
| $H_2$ | — | 203 ppm | — | — |

TABLE II

| Impurity gas | A | B | C |
|---|---|---|---|
| CO | <20 ppb | <20 ppb | 2.9 ppm * |
| $N_2$ | <20 ppb | 160 ppb | 5.6 ppm |
| $CH_4$ | 50 ppb | <10 ppb | <10 ppb |
| $CO_2$ | <10 ppb | <10 ppb | <5 ppb |
| $O_2$ | <40 ppb | 200 ppb | 200 ppb | ppm = parts per million
ppb = parts per billion
* the instrument was damaged during the test It is understood that the pressure drop is also a linear function of the flow rate of gas to be purified, which flow rate may also vary during the practical working of the purifier. Therefore the pressure values should be normalized to a norminal value of flow rate.

Although the invention has been described in considerable detail with reference to certain preferred embodiments designed to teach those skilled in the art how best to practice the invention, it will be realized that other modifications may be employed without departing from the spirit and scope of the appended claims.

What is claimed is:

1. An apparatus for determining the end of useful life of an inert gas purifier (104) having an impure inert gas inlet (106) in fluid communication with a housing (108) containing a gas sorbing material (110), said housing being in fluid communication with a purified gas outlet (112), said apparatus comprising:
   A. a means (114) for measuring the gas pressure (P1) at the inlet (106), and
   B. a means (116) for measuring the gas pressure (Po) at the outlet (112); and
   C. a means (118) for determining the gas pressure difference (Pd=P1−Po) between the inlet (106) and the outlet (112); and
   D. a means (120) for comparing (Pd) with a predetermined pressure value (Pp) and indicating when Pd is greater than Pp thus indicating that the inert gas purifier (104) has reached the end of useful life in which the predetermined pressure value (Pp) is that value corresponding to the pressure difference (Pd) when the impurity level of the purified gas reaches a critical value above which the purified gas is considered insufficiently pure.

2. An apparatus of claim 1 in which the means (114) for measuring the gas pressure ($P_1$) at the inlet (106) indicates the pressure in terms of an electric signal.

3. An apparatus of claim 1 in which the means (116) for measuring the gas pressure ($P_o$) at the outlet (112) indicates the pressure in terms of an electric signal.

4. An apparatus of claim 1 in which the means (118) for determining the gas pressure difference ($P_d$) gives a measurement of the difference in terms of an electric signal.

5. An apparatus of claim 1 in which the means (120) for comparing ($P_d$) with the predetermined pressure value ($P_p$) indicates when $P_d > P_p$ in terms of an electric signal.

6. An apparatus of claim 6 in which the predetermined pressure value ($P_p$) is a value less than that corresponding to the pressure difference ($P_d$) when the impurity level of the purified gas reaches a critical value above which the purified gas is considered insufficiently pure.

7. An apparatus of claim 1 in which the predetermined pressure value ($P_p$) is chosen to be between that value at which the impurity level of the purified gas starts to increase and that value corresponding to the pressure difference ($P_d$) when the impurity level of the purified gas reaches a critical value above which the purified gas is considered insufficiently pure.

8. An apparatus of claim 1 in which the gas sorbing material (110) is chosen from the group consisting of zirconium based alloys and titanium based alloys.

9. An apparatus of claim 1 in which the gas sorbing material (110) is an alloy of Zr-V-Fe when the inert gas is He, Ne, Ar, Kr or Xe.

10. An apparatus of claim 1 in which the gas sorbing material (110) is an alloy of Zr-Fe when the inert gas is $N_2$.

11. An apparatus for determining the end of useful life of an inert gas purifier (104) having an impure inert gas inlet (106) in fluid communication with a housing (108) containing an alloy of Zr-V-Fe when the inert gas to be purified is He, Ne, Ar, Kr or Xe or an alloy of Zr-Fe when the inert gas to be purified is in $N_2$, said housing (108) being in fluid communication with a purified gas outlet (112) said apparatus comprising:
   A. means (114) for measuring the gas pressure ($P_1$) at the inlet (106) said means indicating the pressure in terms of an electric signal; and
   B. means (116) for measuring the gas pressure ($P_p$) at the outlet (112) said means indicating the pressure in terms of an electric signal; and
   C. means (118) for determining the gas pressure difference ($P_d = P_i - P_o$) between the inlet (106) and the outlet (112) in terms of an electric signal; and
   D. means (120) for comparing $P_d$ with a predetermined pressure value ($P_p$) and indicating when $P_d > P_p$ in terms of an electric signal which indicates that the inert gas purifier (104) has reached the end of useful life where ($P_p$) is chosen to be between that value at which the impurity level of the purified gas starts to increase and that value corresponding to the pressure difference ($P_d$) when the impurity level of the purified gas reaches a critical value above which the purified gas is considered insufficiently pure.

12. A method for determining the end or useful life of an inert gas purifier having an impure inert gas inlet in fluid communication with a housing containing a gas sorbing material, said housing being in fluid communication with a purified gas outlet said method comprising the steps of:

A. measuring the gas pressure (P1) at the inlet; and
B. measuring the gas pressure (Po) at the outlet; and
C. determining the gas pressure difference ($P_d = P_1 - P_o$) between the inlet and the outlet; and
D. comparing Pd with a predetermined pressure value Pp and indicating when Pd is greater than Pp to indicate that the inert gas purifier has reached the end of useful life
in which the predetermined pressure value (Pd) when the impurity level of the purified gas reaches a critical value above which the purified gas is considered insufficiently pure.

13. A method of claim 12 in which measuring of the gas pressure ($P_1$) at the inlet indicates the pressure in terms of an electric signal.

14. A method of claim 12 in which the measuring of the gas pressure ($P_o$) at the inlet indicates the pressure in terms of an electric signal.

15. A method of claim 12 in which the determining of the gas pressure difference gives measurement of the difference in terms of an electric signal.

16. A method of claim 12 in which comparing ($P_d$) with the predetermined pressure value ($P_p$) indicates when $P_d > P_o$ in terms of an electric signal.

17. A method of claim 12 in which the predetermined pressure value ($P_p$) is a value less than that corresponding to the pressure difference ($P_d$) when the impurity level of the purified gas reaches a critical value above which the purified gas is considered insufficiently pure.

18. A method of claim 12 in which the predetermined pressure value ($P_p$) is chosen to be between that value at which the impurity level of the purified gas starts to increase and that value corresponding to the pressure difference ($P_d$) when the impurity level of the purified gas reaches a critical value above which the purified gas is considered insufficiently pure.

19. A method of claim 12 in which the gas sorbing material in an alloy of Zr-V-Fe when the inert gas is He, Ne, Ar, Kr or Xe.

20. A method of claim 12 in which the gas sorbing material is an alloy of Zr-Fe when the inert gas is $N_2$.

21. A method for determining the end of useful life of an inert gas purifier having an impure inert gas inlet in fluid communication with a housing containing an alloy of Zr-V-Fe when the inert gas to be purified is He, Ne, Ar, Kr or Xe or an alloy of Zr-Fe when the inert gas to be purified is $N_2$, said housing being in fluid communication with a purified gas outlet said method comprising the steps of:

A. measuring he gas pressure ($P_1$) at the inlet by a means which indicates the pressure in terms of an electric signal; and
B. measuring the gas pressure ($P_p$) at the outlet by a means which indicates the pressure in terms of an electric signal; and
C. determining the gas pressure difference ($P_d = P_1 - P_o$) between the inlet and the outlet in terms of an electric signals; and
D. comparing $P_d$ with a predetermined pressure value ($P_p$) which when $P_d > P_p$ in terms of an electric signal which indicates that the inert gas purifier has reached the end of useful life where $P_p$ is chosen to be between that value at which the impurity level of the purified gas starts to increase and that value corresponding to the pressure difference when the impurity level of the purified gas reaches a critical value above which the purified gas is considered insufficiently pure.

* * * * *

UNITED STATES PATENT AND TRADEMARK OFFICE
CERTIFICATE OF CORRECTION

PATENT NO. : 5,150,604
DATED : September 29, 1992
INVENTOR(S) : Succi, et. al.

It is certified that error appears in the above-indentified patent and that said Letters Patent is hereby corrected as shown below:

Claim 6, Column 6, line 23, for "6" (second occurrence), read --1--; such that Claim 6 is dependnet on Claim 1.

Claim 12, Column 7, line 19, after (Pd) insert --is that value corresponding to the pressure difference (Pd)--.

Claim 13, Column 7, line 23 after "which" insert --the--.

Claim 21, Column 8, line 29 for "signals" read --signal--.

Signed and Sealed this

First Day of February, 1994

Attest:

Attesting Officer

BRUCE LEHMAN

Commissioner of Patents and Trademarks